United States Patent Office 3,455,930
Patented July 15, 1969

3,455,930
(1,2-DIHYDRO-2-HYDROXY-2-QUINOLINYL) UREA COMPOUNDS
Bernard Loev, Broomall, Pa., assignor to Smith Kline & French Laboratories, Philadelphia, Pa., a corporation of Pennsylvania
No Drawing. Continuation-in-part of application Ser. No. 553,057, May 26, 1966. This application Oct. 16, 1967, Ser. No. 675,286
Int. Cl. C07d 33/12, 33/50
U.S. Cl. 260—287       8 Claims

ABSTRACT OF THE DISCLOSURE (1,2 - dihydro-2-hydroxy-2-quinolinyl)urea compounds are prepared by reacting a 2-lower alkoxy or 2-chloroquinolinium salt or a di-lower alkylacetal of a carbostyril with a urea. These compounds have central nervous system depressant and analgesic activity.

This application is a continuation-in-part of Ser. No. 553,057 filed May 26, 1966, now abandoned.

This invention relates to new (1,2-dihydro-2-hydroxy-2-quinolinyl)urea compounds having pharmacodynamic activity in particular having central nervous system depressant activity as demonstrated by administration to rats at 100 to 300 mg./kg. orally in the dose range test and analgesic activity as shown in the D'Amour-Smith test in rats at 50 mg./kg. orally. This invention also relates to intermediates for preparing certain of these compounds.

The compounds of this invention having pharmacodynamic activity are represented by the following formula:

Formula I

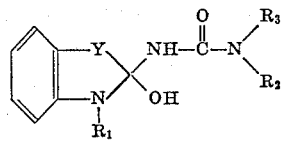

when:

Y is $-CH=CH-$, $-CH_2-CH_2-$ or

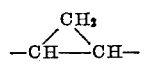

$R_1$ is hydrogen, lower alkyl or lower alkoxy and $R_2$ and $R_3$ are hydrogen or lower alkyl.

The pharmacodynamically active compounds of this invention are quinolinylureas represented by Formula I. However, it is apparent to one skilled in the art that obvious nuclear substituents may be incorporated on the benzenoid ring of the quinoline nucleus. Such substituents, which are known to the art, are halogen, trifluoromethyl, lower alkyl, lower alkoxy, hydroxy, nitro, amino, mono-lower alkylamino, di-lower alkylamino, lower alkanoylamino, lower alkoxycarbonyl, carboxy, carbamoyl, sulfamoyl or methylenedioxy. These substituted compounds are used as are the parent compounds.

Advantageous compounds of this invention are represented by Formula I when:

Y is $-CH=CH-$, $-CH_2-CH_2-$ or

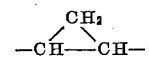

$R_1$ is methyl and
$R_2$ and $R_3$ are hydrogen.

Optionally, the advantageous compounds have a chloro or trifluoromethyl substituent on the benzenoid ring of the quinoline nucleus.

Also included in this invention are benzyl compounds represented by the following formula:

Formula II

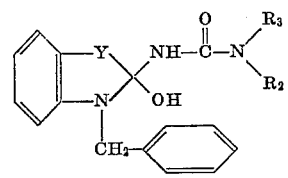

when:
Y, $R_2$ and $R_3$ are as defined in Formula I.

The benzyl compounds of Formula II are useful as intermediates in the preparation of compounds of Formula II in which $R_1$ is hydrogen as is described below.

Benzyl compounds represented by Formula II may substituents, such as halogen, trifluoromethyl, lower alkyl, lower alkoxy, hydroxy, nitro, amino, mono-lower alkylamino, di-lower alkylamino, lower alkanoylamino, lower alkoxycarbonyl, benzyloxycarbonyl, carbamoyl, sulfamoyl, or methylenedioxy, incorporated on the benzenoid ring of the quinoline nucleus. These compounds are used, as described herebelow, to prepare pharmacodynamically active compounds which have the structure represented by Formula I in which $R_1$ is hydrogen and which are substituted on the benzenoid ring of the quinoline nucleus.

The terms "lower alkyl," "lower alkoxy" and "lower alkanoyl" where used herein denote groups having 1–4, preferably 1–2, carbon atoms and "halogen" denotes chloro, bromo or fluoro.

Compounds of this invention are prepared by the following procedure:

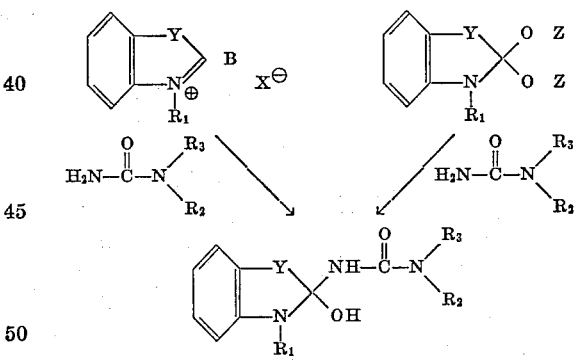

The terms Y, $R_2$ and $R_3$ are as defined above;
$R_1$ is lower alkyl, lower alkoxy or benzyl;
Z is lower alkyl;
B is lower alkoxy, preferably methoxy or ethoxy, or chloro and
X is an anion such as methosulfate or fluoborate.

According to the above procedure, a quinolinium salt or a di-lower alkylacetal of a carbostyril is reacted with a urea of the formula

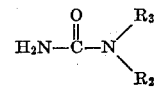

in which $R_2$ and $R_3$ are as defined above. The reaction is carried out in an inert solvent such as a lower alkanol at about room temperature for about 1–6 hours using about equimolar amounts of the reactants.

The 2-lower alkoxyquinolinium salts are prepared by reacting a carbostyril with an alkylating agent such as a lower alkylsulfate or a tri-lower alkyloxonium fluoborate. The lower alkylsulfate salts are prepared by reacting equimolar amounts of the carbostyril and the lower alkylsulfate at elevated temperature, for example at about 70–100° C., for about 1–3 hours. The fluoborate salts are prepared by reacting equimolar amounts of the carbostyril and the tri-lower alkyloxonium fluoborate at about room temperature in an inert solvent such as methylene chloride.

Alternatively, the 2-lower alkoxyquinolinium salts are prepared by reacting a 2-lower alkylquinoline with a lower alkylsulfate or -halide, preferably in an inert solvent such as chloroform, benzene or a lower alkanol.

The 2-chloroquinolinium salts are prepared by reacting an N-unsubstituted carbostyril with a chlorinating agent such as phosphorus pentachloride, phosphorus oxychloride, tosyl chloride in pyridine or carbonyl chloride, then forming the N-lower alkylquinolinium salt with an alkylating agent such as a lower alkylsulfate or a tri-lower alkyloxonium fluoborate as described above for the preparation of the 2-lower alkoxyquinolinium salts.

The di-lower alkylacetals of carbostyrils are prepared by treating the quinolinium salts with a sodium lower alkoxide. The reaction is carried out in a lower alkanol solvent at about room temperature for about 15 minutes to four hours. The lower alkanol solution is concentrated in vacuo and the residue is distilled. Alternatively, the lower alkanol solution may be used directly in the reaction with a urea described above.

The carbostyrils are either known to the art or are prepared by known methods, for example as described in U.S. 3,141,888.

The compounds of Formula I in which $R_3$ is hydrogen are prepared by hydrogenatiton of the benzyl intermediates of Formula II. The hydrogenation is carried out at room temperature in the presence of a catalyst such as, for example, platinum in ethyl acetate.

Substituents, such as halogen, trifluoromethyl, lower alkyl, lower alkoxy, hydroxy, nitro, di-lower alkylamino, lower alkanoylamino, lower alkoxycarbonyl, benzyloxycarbonyl, carbamoyl, sulfamoyl or methylenedioxy, may be present on the benzenoid ring of the starting materials to prepare substituted quinolinylureas.

Compounds having the basic structure represented by Formulas I and II and having an amino or mono-lower alkylamino substituent on the benzenoid ring of the quinoline are prepared as follows. The amino substituted compounds are prepared by reducing the corresponding nitro substituted compounds by catalytic hydrogenation at room temperature or chemically, for example, with stannous chloride in hydrochloric acid. The mono-lower alkylamino substituted compounds are prepared by monoalkylating the amino substituted compound by reacting with about an equimolar amount of an alkylating agent.

Compounds having the basic structure represented by Formula I and having a carboxy substituent on the benzenoid ring of the quinoline are prepared by catalytic hydrogenation of the corresponding benzyloxycarbonyl substituted compounds at room temperature using, for example palladium-on-carbon in ethyl acetate.

Compounds having the basic structure represented by Formula I in which $R_1$ is hydrogen and having a nitro substituent on the benzenoid ring of the quinoline are prepared by oxidizing the corresponding amino substituted compounds using peroxyfluoroacetic acid.

The compounds of Formula I may be administered internally in conventional dosage forms by incorporating an appropriate dose of the compound with pharmaceutical carriers according to accepted pharmaceutical practices.

The compounds of this invention are designated herein and set forth in Formulas I and II as (1,2-dihydro-2-hydroxy-2-quinolinyl)ureas; however, it is possible that the compounds of this invention may have the following structural formulas:

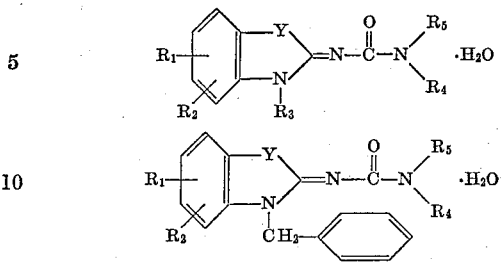

The following examples are not limiting but are illustrative of the compounds of this invention and procedures for their preparation.

EXAMPLE 1

A mixture of 15.9 g. of 1-methylcarbostyril and 12.6 g. of methyl sulfate is heated in an oil bath at 80° C. for two hours, then cooled and washed with ether to give 2-methoxy-1-methylquinolinium methosulfate.

To 1.8 g. of sodium methoxide in 25 ml. of ethanol is added 9.5 g. of 2-methoxy-1-methylquinolinium methosulfate. The resulting mixture is stirred for 1.5 hours. Two grams of urea is added and the mixture is stirred for three hours, then filtered and concentrated in vacuo. The residue is extracted with methylene chloride. The extracts are concentrated in vacuo and the residue is recrystallized from acetonitrile to give (1,2-dihydro-2-hydroxy-1-methyl-2-quinolinyl)urea.

EXAMPLE 2

By the procedure of Example 1 using, in place of urea, 2.6 g. of 1,1-dimethylurea the product is 1-(1,2-dihydro-2-hydroxy-1-methyl-2-quinolinyl)-3,3-dimethylurea.

Similarly, using 3.5 g. of butylurea the product is 1-butyl-3-(1,2-dihydro-2-hydroxy - 1 - methyl-2-quinolinyl) urea.

EXAMPLE 3

To 46 g. of 1-methylcarbostyril in 60 ml. of methylene chloride at room temperature is added 55 g. of triethyloxonium fluoborate. Filtering gives 2-ethoxy-1-methylquinolinium fluoborate.

2-ethoxy-1-methylquinolinium fluoborate (62 g.) is added in portions over one hour to a solution of 23 g. of sodium ethoxide in 250 ml. of ethanol. After one hour, the mixture is filtered, concentrated and filtered in vacuo. Hexane is added to the solid material and the resulting solution is filtered, concentrated and distilled to give the diethyl acetal of 1-methylcarbostyril.

A mixture of 7.7 g. of the above prepared acetal and 2.2 g. of methylurea in 100 ml. of ethanol is stirred for four hours at room temperature, then filtered, concentrated in vacuo and filtered to give a solid material which is extracted with methylene chloride. Concentrating the extracts in vacuo and filtering gives 1-(1,2-dihydro-2-hydroxy-1-methyl-2-quinolinyl)-3-methylurea.

EXAMPLE 4

By the procedure of Example 3 the following carbostyrils are converted to the quinolinium fluoborate salts:
1-methyl-6-trifluoromethylcarbostyril
3,4-dihydro-1-methyl-6-trifluoromethylcarbostyril.

Each of the above prepared salts is added in portions over one hour to sodium ethoxide in ethanol and the resulting mixture is stirred with urea for three hours, then filtered and concentrated in vacuo. Extracting with methylene chloride, then removing the methylene chloride from the extracts in vacuo gives the following products, respectively:

(1,2-dihydro-2-hydroxy-1-methyl-6-trifluoromethyl 2-quinolinyl)urea (1,2,3,4-tetrahydro-2-hydroxy-1-methyl-6-trifluoromethyl-2-quinolinyl)urea.

EXAMPLE 5

The following compounds are converted to the quinolinium fluoborate salts by the procedure of Example 3:

1a,7b-dihydro-3-methyl-1H-cyclopropa[c]quinolin-2-one
1a,7b-dihydro-3-methyl-6-trifluoromethyl-1H-cyclopropa[c]quinolin-2-one
1a,7b-dihydro-3-methyl-5,6-methylenedioxy-1H-cyclopropa[c]quinolin-2-one
1a,7b-dihydro-3-methoxy-1H-cyclopropa[c]quinolin-2-one
3-benzyl-6-chloro-1a,7b-dihydro-1H-cyclopropa[c]-quinolin-2-one.

Using the above prepared salts in the procedure of Example 4 gives the following compounds, respectively:

(1a,2,3,7b-tetrahydro-2-hydroxy-3-methyl-1H-cyclopropa[c]quinolinyl)urea
(1a,2,3,7b-tetrahydro-2-hydroxy-3-methyl-1H-cyclopropa[c]quinolinyl)urea
(1a,2,3,7b-tetrahydro-2-hydroxy-3-methyl-5,6-methylenedioxy-1H-cyclopropa[c]quinolinyl)urea
(1a,2,3,7b-tetrahydro-2-hydroxy-3-methoxy-1H-cyclopropa[c]quinolinyl)urea
(3-benzyl-6-chloro-1a,2,3,7b-tetrahydro-1H-cyclopropa[c]quinolinyl)urea.

Hydrogenating the above prepared 3-benzyl compound in ethanol at room temperature using palladium-on-carbon as catalyst, then filtering and removing the ethanol in vacuo gives (6-chloro-1a,2,3,7b-tetrahydro-1H-cyclopropa[c]-quinolinyl)urea.

EXAMPLE 6

Using the following carbostyrils in place of 1-methylcarbostyril in the procedure of Example 1:

6-methoxy-1-methylcarbostyril
6,7-dimethoxy-1-methylcarbostyril
6-bromo-1-methylcarbostyril
6-acetamido-1-methylcarbostyril
1-methyl-6-nitrocarbostyril
1-methyl-6-sulfamoylcarbostyril
6-methoxycarbonyl-1-methylcarbostyril
1,7-dimethylcarbostyril
6-carbamoyl-1-methylcarbostyril
6-dimethylamino-1-methylcarbostyril
8-chloro-1-methylcarbostyril
5,7-dichloro-1-methylcarbostyril
1-ethoxycarbostyril the following products are obtained, respectively:

(1,2-dihydro-2-hydroxy-6-methoxy-1-methyl-2-quinolinyl)urea
(1,2-dihydro-2-hydroxy-6,7-dimethoxy-1-methyl-2-quinolinyl)urea
(6-bromo-1,2-dihydro-2-hydroxy-1-methyl-2-quinolinyl)urea
(6-acetamido-1,2-dihydro-2-hydroxy-1-methyl-2-quinolinyl)urea
(1,2-dihydro-2-hydroxy-1-methyl-6-nitro-2-quinolinyl)urea
(1,2-dihydro-2-hydroxy-1-methyl-6-sulfamoyl-2-quinolinyl)urea
(1,2-dihydro-2-hydroxy-6-methoxycarbonyl-1-methyl-2-quinolinyl)urea
(1,2-dihydro-2-hydroxy-1,7-dimethyl-2-quinolinyl)-urea
(6-carbamoyl-1,2-dihydro-2-hydroxy-1-methyl-2-quinolinyl)urea
(1,2-dihydro-6-dimethylamino-2-hydroxy-1-methyl-2-quinolinyl)urea
(8-chloro-1,2-dihydro-2-hydroxy-1-methyl-2-quinolinyl)urea
(5,7-dichloro-1,2-dihydro-2-hydroxy-1-methyl-2-quinolinyl)urea
(1-ethoxy-1,2-dihydro-2-hydroxy-2-quinolinyl)urea.

Similarly, using 6-hydroxy-1-methylcarbostyril and 6,7-dihydroxy-1-methylcarbostyril (prepared by refluxing the corresponding 6-methoxy and 6,7-dimethoxy compounds, respectively, with hydrobromic acid in acetic acid for four hours, then concentrating in vacuo and recrystallizing from ethanol-hexane) in the procedure of Example 1 gives (1,2-dihydro-2,6-dihydroxy - 1-methyl - 2-quinolinyl)urea and 1,2 - dihydro - 2,6,7 - trihydroxy - 1 - methyl - 2-quinolinyl)urea, respectively.

EXAMPLE 7

Two grams of (1,2-dihydro-2-hydroxy-1-methyl-6-nitro-2-quinolinyl)urea is hydrogenated in 50 ml. of ethyl acetate containing 0.5 g. of Raney nickel until one equivalent of hydrogen is taken up. Filtering and removing the solvent in vacuo gives (6-amino-1,2-dihydro-2-hydroxy-1-methyl-2-quinolinyl)urea.

Heating the above prepared amino compound with an equimolar amount of methyl iodide in methanol at 50° C. for two hours, then removing the solvent in vacuo, stirring the residue with dilute sodium carbonate solution and filtering gives (1,2-dihydro-2-hydroxy-1-methyl-6-methylamino-2-quinolinyl)urea.

By the same procedure using ethyl bromide and butyl bromide in ethanol the products are, respectively, (6-ethylamino - 1,2 - dihydro - 2 - hydroxy - 1 - methyl - 2-quinolinyl)-urea and (6-butylamino - 1,2 - dihydro - 2-hydroxy-1-methyl-2-quinolinyl)urea.

EXAMPLE 8

A mixture of 16 g. of 2-chloroquinoline and 13 g. of benzyl chloride in chloroform is heated at reflux for one hour, then concentrated in vacuo. The residue is treated with ether and filtered to give 1-benzyl-2-chloroquinolinium chloride.

To 2.7 g. of sodium methoxide in anhydrous methanol is added 14.4 g. of 1-benzyl-2-chloroquinolinium chloride and the resulting mixture is stirred for four hours. Three grams of urea is added and the mixture is stirred for three hours. Filtering, concentrating in vacuo, extracting with methylene chloride and removing the methylene chloride from the extracts in vacuo gives (1-benzyl-1,2-dihydro-2-hydroxy-2-quinolinyl)urea.

Hyrogenating the above prepared 1-benzyl compound by the procedure of Example 5 gives (1,2-dihydro-2-hydroxy-2-quinolinyl)urea.

EXAMPLE 9

A mixture of equimolar amounts of 2-methoxyquinoline and methylsulfate in chloroform is heated at reflux for one hour. Ether is added and the mixture is filtered to give 2-methoxy-1-methylquinolinium methosulfate.

An ethanol solution of the above prepared methosulfate salt is treated with one molar equivalent of ethylurea. The mixture is stirred for two hours at room temperature, then filtered, concentrated in vacuo and extracted with methylene chloride. Removing the methylene chloride from the extracts in vacuo gives 1-ethyl-3-(1,2-dihydro-2-hydroxy-1-methyl-2-quinolinyl)urea.

EXAMPLE 10

An ethanol solution of 6-methoxycarbonyl-1-methylcarbostyril is heated at reflux with an excess of 10% sodium hydroxide solution. Cooling, acidifying and filtering the mixture gives 6-carboxy-1-methylcarbostyril.

6-benzyloxycarbonyl - 1 - methylcarbostyril is prepared by refluxing a mixture of 10 g. of 2-carboxy-1-methylcarbostyril, 2.7 g. of sodium methoxide and 8.4 g. of benzyl bromide in ethanol for four hours, then filtering and evaporating the filtrate to dryness.

Using the above prepared 6-benzyloxycarbonyl-1-methylcarbostyril in the procedure of Example 1, the product is (6-benzyloxycarbonyl-1,2-dihydro-2-hydroxy-1-methyl-2-quinolinyl)urea.

Hydrogenating the above prepared 6-benzyloxycarbonyl compound in ethyl acetate using palladium-on-carbon as catalyst, then filtering and removing the solvent in vacuo gives (6-carboxy-1,2-dihydro-2-hydroxy-1-methyl-2-quinolinyl)urea.

EXAMPLE 11

Using 3,4-dihydro-1-methylcarbostyril (prepared by hydrogenating 1-methylcarbostyril in ethanol in the presence of Raney nickel) in the procedure of Example 1, the product is (1,2,3,4-tetrahydro-2-hydroxy-1-methyl-2-quinolinyl)urea.

Similarly, using 1-ethyl-3,4-dihydrocarbostyril and 1,1-diethylurea in the procedure of Example 1, the product is 1,1-diethyl-3-(1,2,3,4-tetrahydro-2-hydroxy-1-methyl-2-quinolinyl)urea.

EXAMPLE 12

A mixture of 21.5 g. of 3,4-dihydro-6-trifluoromethylcarbostyril, 12.6 g. of benzyl chloride and 2.3 g. of sodium hydride in tetrahydrofuran is heated at reflux for one hour to give, after concentrating in vacuo, adding ether and filtering, then concentrating the ethereal solution, 1-benzyl-3,4-dihydro-6-trifluoromethylcarbostyril.

Using the above prepared carbostyril in the procedure of Example 4 gives (1-benzyl-1,2,3,4-tetrahydro-2-hydroxy-6-trifluoromethyl-2-quinolinyl)urea.

Hydrogenating the above prepared benzyl compound by the procedure of Example 5 gives (1,2,3,4-tetrahydro-2-hydroxy-6-trifluoromethyl-2-quinolinyl)urea.

What is claimed is:

1. A compound of the formula:

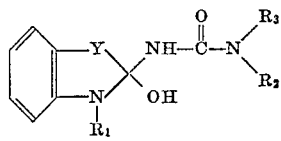

in which:
Y is —CH=CH—, —CH$_2$—CH$_2$— or

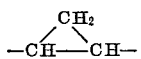

$R_1$ is hydrogen, lower alkyl or lower alkoxy and $R_2$ and $R_3$ are hydrogen or lower alkyl.

2. A compound according to claim 1 in which Y is —CH=CH—, $R_1$ is methyl and $R_2$ and $R_3$ are hydrogen, said compound being (1,2-dihydro-2-hydroxy-1-methyl-2-quinolinyl)urea.

3. A compound according to claim 1 in which Y is —CH=CH—, $R_1$ and $R_2$ are methyl and $R_3$ is hydrogen, said compound being 1-(1,2-dihydro-2-hydroxy-1-methyl-2-quinolinyl)-3-methylurea.

4. A compound according to claim 1 in which Y is —CH=CH— and $R_1$, $R_2$ and $R_3$ are methyl, said compound being 1-(1,2-dihydro-2-hydroxy-1-methyl-2-quinolinyl)-3,3-dimethylurea.

5. A compound according to claim 1 in which Y is —CH=CH—, $R_1$ is methyl, $R_2$ is butyl and $R_3$ is hydrogen, said compound being 1-butyl-3-(1,2-dihydro-2-hydroxy-1-methyl-2-quinolinyl)urea.

6. A compound according to claim 1 in which Y is

$R_1$ is methyl and $R_2$ and $R_3$ are hydrogen, said compound being (1a,2,3,7b-tetrahydro-2-hydroxy-3-methyl-1H-cyclopropa[c]quinolinyl)urea.

7. A compound of the formula:

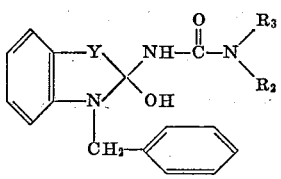

in which:
Y is —CH=CH—, —CH$_2$—CH$_2$— or

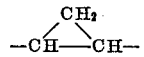

$R_2$ and $R_3$ are hydrogen or lower alkyl.

8. A compound according to claim 1 in which Y is —CH=CH— and $R_2$ and $R_3$ are hydrogen, said compound being (1-benzyl-1,2-dihydro-2-hydroxy-2-quinolinyl)urea.

References Cited

UNITED STATES PATENTS

| | | | |
|---|---|---|---|
| 2,754,293 | 7/1956 | Brody et al. | 260—288 X |
| 3,141,888 | 7/1964 | Loev | 260—289 |
| 3,300,502 | 1/1967 | Seeger | 260—289 |

ALEX MAZEL, Primary Examiner

D. G. DAUS, Assistant Examiner

U.S. Cl. X.R.

260—286, 288, 289, 555, 687, 690, 694, 999